United States Patent
Eriksson et al.

(10) Patent No.: US 8,021,089 B2
(45) Date of Patent: Sep. 20, 2011

(54) METHOD AND SYSTEM FOR PRODUCING HOLES OF VARIOUS DIMENSIONS AND CONFIGURATIONS IN A WORKPIECE

(75) Inventors: Ingvar Eriksson, Stockholm (SE); Erik Odén, Täby (SE)

(73) Assignee: Novator AB (SE)

( * ) Notice: Subject to any disclaimer, the term of this patent is extended or adjusted under 35 U.S.C. 154(b) by 825 days.

(21) Appl. No.: 11/629,023

(22) PCT Filed: Jun. 9, 2005

(86) PCT No.: PCT/SE2005/000873
§ 371 (c)(1),
(2), (4) Date: Apr. 17, 2008

(87) PCT Pub. No.: WO2005/120752
PCT Pub. Date: Dec. 22, 2005

(65) Prior Publication Data
US 2008/0267728 A1    Oct. 30, 2008

Related U.S. Application Data

(60) Provisional application No. 60/521,637, filed on Jun. 9, 2004.

(51) Int. Cl.
*B23B 35/00* (2006.01)
*B23C 1/20* (2006.01)
*B23C 3/00* (2006.01)

(52) U.S. Cl. ........... 409/132; 408/1 R; 408/97; 408/9; 408/115 R; 408/16; 409/193; 409/200

(58) Field of Classification Search .......... 409/131–132, 409/186, 188, 193, 195, 199–200, 207, 231; 408/1 R, 8–10, 12, 16, 95, 97, 115 R, 3
See application file for complete search history.

(56) References Cited

U.S. PATENT DOCUMENTS
2,915,926 A * 12/1959 Woerner ............... 408/241 R
(Continued)

FOREIGN PATENT DOCUMENTS
FR    2691660 A1    12/1993
(Continued)

OTHER PUBLICATIONS

"Japanese Application Serial No. 2007-527136, Office Action", (2010), 3 pgs.
(Continued)

*Primary Examiner* — Daniel W Howell
(74) *Attorney, Agent, or Firm* — Schwegman, Lundberg & Woessner, P.A.

(57) ABSTRACT

Method and system for producing holes of various dimensions and configurations in a workpiece (42) using a portable orbital drilling machine (44), wherein said workpiece has attached thereto a template (10) with preformed guide holes (12-40) located in a pattern corresponding to the positions of the holes to be formed in the workpiece. Each guide hole (12-40) is provided with a readable information carrier (12*i*-40*i*) containing an identification of the respective guide hole. When fixating the drilling machine (44) in a guide hole, the latter is identified by a hole database (48) by sensing the respective information carrier. A control unit (50) associated with the hole database (48) controls the drilling machine (44) to perform a relevant hole-cutting process in the workpiece.

22 Claims, 1 Drawing Sheet

U.S. PATENT DOCUMENTS

| | | | |
|---|---|---|---|
| 4,332,066 A | | 6/1982 | Hailey et al. |
| 5,181,808 A | | 1/1993 | Griggs et al. |
| 5,929,757 A | * | 7/1999 | Sternal et al. ............... 340/540 |
| 6,357,101 B1 | * | 3/2002 | Sarh et al. ................. 29/407.09 |
| 6,382,890 B1 | * | 5/2002 | Linderholm ................. 409/191 |
| 6,419,426 B1 | | 7/2002 | Chalupa et al. |
| 6,855,099 B2 | * | 2/2005 | Hazlehurst et al. ............ 483/38 |
| 6,902,361 B2 | * | 6/2005 | Pettersson et al. ............ 409/178 |
| 7,179,028 B2 | * | 2/2007 | Linderholm ................. 409/179 |
| 7,364,388 B2 | * | 4/2008 | Faul et al. ................. 408/115 R |
| 2002/0054795 A1 | | 5/2002 | Chalupa et al. |
| 2010/0040426 A1 | * | 2/2010 | Pettersson ................. 408/115 B |
| 2010/0098507 A1 | * | 4/2010 | Binmore ..................... 408/1 R |

FOREIGN PATENT DOCUMENTS

| | | |
|---|---|---|
| JP | 61-038808 A | 2/1986 |
| JP | 10-043917 A | 2/1998 |
| JP | 2003-150230 A | 5/2003 |
| WO | WO-94/17944 A1 | 8/1994 |
| WO | WO-01/15870 A2 | 3/2001 |
| WO | WO-02/102535 A1 | 12/2002 |

OTHER PUBLICATIONS

"International Search Report for Application No. PCT/SE2005/000873", 3 Pages.

* cited by examiner

METHOD AND SYSTEM FOR PRODUCING HOLES OF VARIOUS DIMENSIONS AND CONFIGURATIONS IN A WORKPIECE

RELATED APPLICATIONS

This application is a nationalization under 35 U.S.C. 371 of PCT/SE2005/000873, filed Jun. 9, 2005 and published as WO 2005/120752 A1, on Dec. 22, 2005, which claimed priority under U.S.C. 119(e) United States Provisional Patent Application No. 60/521,637, filed Jun. 9, 2004, which applications and publication are incorporated herein by reference and made a part hereof.

BACKGROUND OF THE INVENTION

1. Field of the Invention

The present invention relates generally to a method of producing holes of various dimensions and configurations in a workpiece using a portable orbital drilling machine, said workpiece having attached thereto a template with preformed guide holes located in a pattern corresponding to the positions of the holes to be formed in the workpiece. The invention also relates a system for carrying out this method.

2. Description of Related Art

When producing a plurality of holes of various dimensions and configurations in a workpiece of composite material, such as fiber-reinforced composite materials, laminates, stacks of identical or various materials, etc., use of a portable orbital drilling machine is in many instances preferred, since all holes could normally be formed with one and the same cutting tool. In order to accurately locate the drilling machine to the position of the hole to be produced a template having preformed guide holes or bushings is fixated in a correct position to the workpiece. The drilling machine is then fixated successively to a respective guide hole or bushing in the template and is brought to perform an orbital cutting process relevant to the respective hole. Examples of such known hole-producing methods and devices are disclosed in WO 94/17944, WO 01/15870, and WO 02/102535. As many holes of various size and configurations are to be formed in a rapid sequence, the operator may have difficulties in identifying the guide hole and establishing which specific hole-cutting processing data should be applied by the drilling machine to the guide hole in question.

SUMMARY OF THE INVENTION

It is an object of the present invention to provide a method of producing holes of various dimensions and configurations in a workpiece using a portable orbital drilling machine, wherein said workpiece have attached thereto a template with pre-formed guide holes located in a pattern corresponding to the positions of the holes to be formed in the workpiece, which method obviates the risk of mixing-up hole-cutting processing data for the various holes to be formed in the workpiece and positively ensures a desired performance of the cutting tool of the drilling machine so as to obtain correctly formed holes. To this end, the method of the invention is characterized by the features set forth in claim 1.

It is a further object of the present invention to provide a system for safely carrying out the method. To this end, the system of the invention includes the features specified in the independent claim 3.

Further details and advantages of the method and system of the present invention will be apparent from the following detailed description and claims with reference to the accompanying drawings.

DETAILED DESCRIPTION OF A PREFERRED EMBODIMENT

Figure 1:
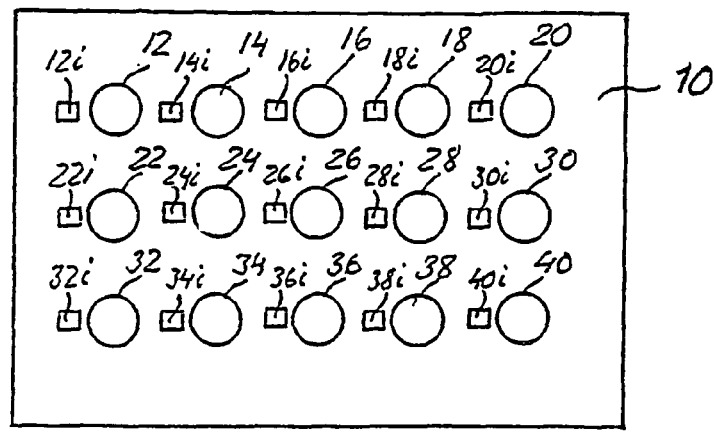
FIG. 1 is a plan view of a template having guide holes for attachment of an orbital drilling machine.

FIG. 1 shows a template 10 with a plurality of guide holes 12, 14, 16, 18, . . . 40 located in a pattern corresponding to the positions of the holes to be formed in a workpiece 42 to which the template 10 is attached. Alternatively, guide bushings (not shown) inserted in the guide holes 12-40 of the template 10 may form guide holes for the fixation of a drilling machine 44 to the template 10. The drilling machine 44 has a rotary cutting tool 45 and a suitable fixation device for fixating the machine to the template 10, for example a fixation sleeve 46 having a slide fit with the guide holes 12-40. The workpiece 42 may consist of composite materials, such as fiber-reinforced composite materials, laminates, stacks of identical or various materials, etc. In order to produce flawless holes of various configurations and dimensions therein with help of one and the same cutting tool use of a portable orbital drilling machine 44 is preferred. As many holes of various size and configurations are to be formed in a rapid sequence, the operator may have difficulties in identifying the guide hole in which the machine 44 is fixated, and establishing which specific hole-cutting processing data should be applied by the drilling machine to the guide hole in question.

According to the invention a unique, individual marking or information carrier 12*i*-40*i* containing an identification of the hole to be formed is affixed adjacent to each guide hole 12-40 on the template 10. The markings or information carriers 12*i*-40*i* may consist of any suitable type of readable ID, such as a RFID tag or chip, a pin code, a color marking, etc., and can be identified by a reader or sensor 47 of the orbital drilling machine 44.

Figure 2:
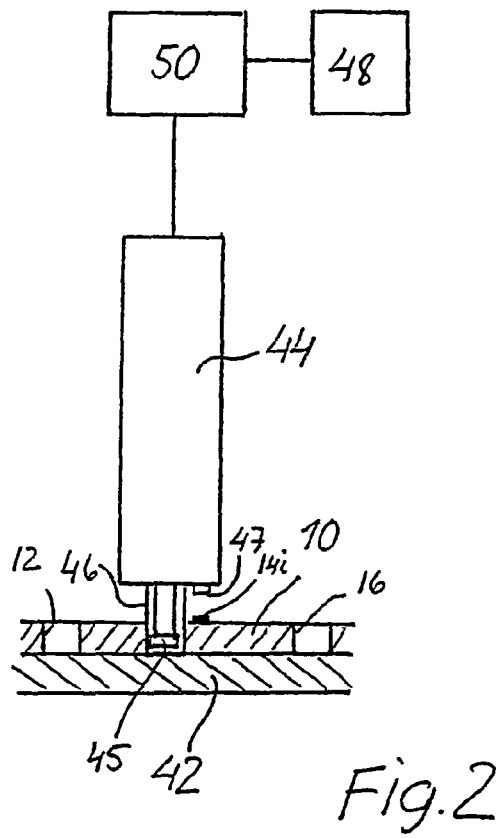
FIG. 2 is a schematic side elevational view of an orbital drilling machine fixated in a guide hole of a template.

As shown schematically in FIG. 2, when attaching the drilling machine 44 to a guide hole 14 in the template 10, the sensor 47 will detect the hole identity of the adjacent information carrier 14*i* and transmit it to a hole database 48 containing all relevant information of the respective hole to be formed, such as type of hole, various processing and dimensional parameters thereof, e.g. diameter, depth and configuration of the hole, cutting advancement speed, countersinks, etc. Then, a control unit 50 connected, either by cables or wirelessly, to the hole database 48 and to the orbital drilling machine 44 is adapted to control the machine to carry out the relevant hole cutting process in the workpiece 42. Thus, the operator may only have to fixate the drilling machine 44 in the guide holes 12-40 and to activate it to initiate the relevant hole-cutting process.

Figure 3:
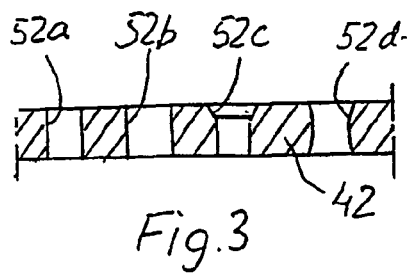
FIG. 3 is a sectional view of a workpiece having finished holes of various configurations.

FIG. 3 illustrates a workpiece in which various types of holes 52*a*-*d* have been produced by the same cutting tool 45 of the portable orbital drilling machine 44.

After the production of all holes in the workpiece a control measurement thereof may be performed by means of a measuring probe to establish any discrepancies from the predetermined parameters requiring renewed treatment of the hole in question. The control unit 50 of the orbital drilling machine 44 may be connected to a local network including a surveillance database (not shown) storing information regarding when and how the holes in the workpiece have been produced. Measurement results of the drilled holes may be stored in the surveillance database. A surveillance system may read the data from the surveillance database and may then be used for checking whether the holes in the workpiece have been drilled in a correct sequence, at the right time, with the correct parameters, by a correct cutting tool, etc.

The invention claimed is:

1. Method of producing holes of various dimensions and configurations in a workpiece using a portable orbital drilling machine, said workpiece having attached thereto a template with preformed guide holes located in a pattern corresponding to the positions of the holes to be formed in the workpiece, comprising:
   a) providing each guide hole with a readable information carrier containing an identification of the respective guide hole;
   b) identifying, when fixating the orbital drilling machine in a guide hole of the template, in which guide hole the drilling machine has been fixated by detecting the respective information carrier;
   c) transmitting the detected guide hole identification information to a hole database containing relevant process and dimensional parameters of the hole to be formed in the workpiece by the drilling machine fixated in that guide hole;
   d) instructing, by means of a control unit communicating with the hole database, the drilling machine to perform in the workpiece a hole-cutting process relevant to the identified position of the drilling machine; and
   e) successively repeating the above-mentioned steps b)-d) to complete the forming of all holes.

2. The method of claim 1, further comprising performing a control measurement of the produced holes to establish any discrepancies from the predetermined parameters.

3. System for producing holes of various dimensions and configurations in a workpiece, comprising:
   a portable orbital drilling machine having a rotary cutting tool and configured to be detachably fixated in preformed guide holes of a template which is attached to the workpiece such that the guide holes of the template are located in a pattern corresponding to the positions of the holes to be formed in the workpiece;
   an individual, readable information carrier containing a relevant hole identification, assigned and attached adjacent to each of the guide holes of the template;
   a sensor mounted to the drilling machine and configured, when fixating the drilling machine in a guide hole of the template, to detect the information carrier of the respective guide hole and to transmit the relevant information thereof to a hole database; and
   a control unit configured to receive from the hole database hole-processing data relevant to the hole to be formed, and configured to instruct the drilling machine to carry out the relevant hole-cutting process in the workpiece to form a predetermined hole in the workpiece accordingly.

4. The system of claim 3, wherein the readable information carrier includes a RFID chip.

5. The system of claim 3, wherein the readable information carrier includes a pin code tag.

6. The system of claim 3, wherein the readable information carrier includes a color mark.

7. The system of claim 3, wherein the sensor includes an antenna configured to detect the information carrier without contacting the same.

8. The system of claim 7, wherein the sensor is configured to transmit the detected relevant hole identification to the hole database through a wireless connection.

9. The system of claim 3, wherein the control unit is integrated in the drilling machine.

10. The system of claim 3, wherein the control unit is an external unit connected to the drilling machine through a cable arrangement.

11. The system of claim 4, wherein the sensor includes an antenna configured to remotely detect the information carrier without mechanically contacting the same.

12. The system of claim 11, wherein the sensor is configured to transmit the detected relevant hole identification to the hole database through a wireless connection.

13. The system of claim 12, wherein the control unit is integrated in the drilling machine.

14. The system of claim 12, wherein the control unit is an external unit connected to the drilling machine through a cable arrangement.

15. The system of claim 5, wherein the sensor includes an antenna configured to remotely detect the information carrier without mechanically contacting the same.

16. The system of claim 15, wherein the sensor is configured to transmit the detected relevant hole identification to the hole database through a wireless connection.

17. The system of claim 16, wherein the control unit is integrated in the drilling machine.

18. The system of claim 16, wherein the control unit is an external unit connected to the drilling machine through a cable arrangement.

19. The system of claim 6, wherein the sensor includes an antenna configured to remotely detect the information carrier without mechanically contacting the same.

20. The system of claim 19, wherein the sensor is configured to transmit the detected relevant hole identification to the hole database through a wireless connection.

21. The system of claim 20, wherein the control unit is integrated in the drilling machine.

22. The system of claim 20, wherein the control unit is an external unit connected to the drilling machine through a cable arrangement.

* * * * *